Feb. 8, 1966   W. R. AIKEN   3,234,428
ENERGIZING MEANS FOR ELECTROLUMINESCENT CELL LIGHTING SYSTEM
Filed April 2, 1962   3 Sheets-Sheet 1

INVENTOR.
WILLIAM R. AIKEN
BY *Berman Jackson Boettcher + Dunner*

ATTYS.

Feb. 8, 1966    W. R. AIKEN    3,234,428
ENERGIZING MEANS FOR ELECTROLUMINESCENT CELL LIGHTING SYSTEM
Filed April 2, 1962    3 Sheets-Sheet 2

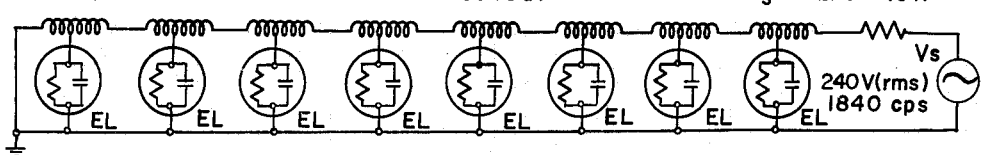

FIG.4    L=1.5h    C=.0045uf    $R_s = \sqrt{L/C} = 18K$
240V(rms) 1840 cps

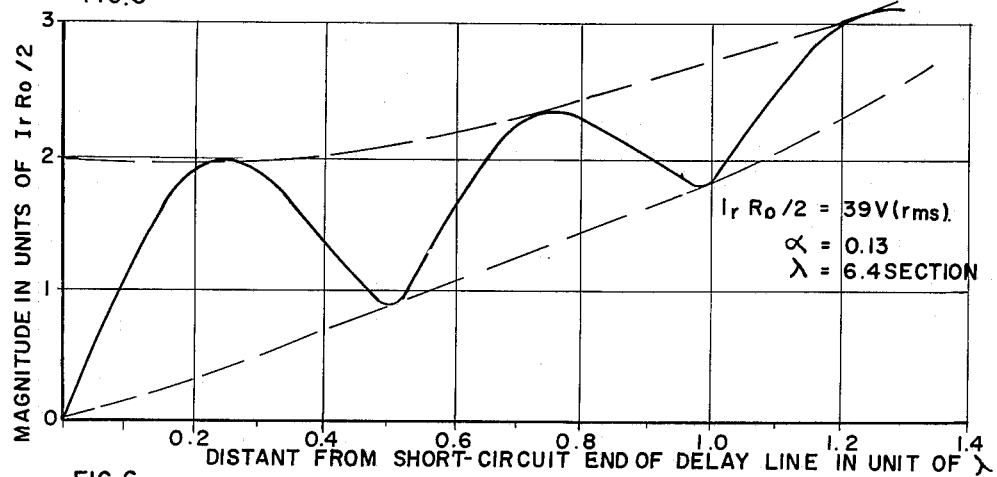

FIG.5

$I_r R_0/2 = 39V(rms)$
$\alpha = 0.13$
$\lambda = 6.4$ SECTION

MAGNITUDE IN UNITS OF $I_r R_0/2$

DISTANT FROM SHORT-CIRCUIT END OF DELAY LINE IN UNIT OF $\lambda$

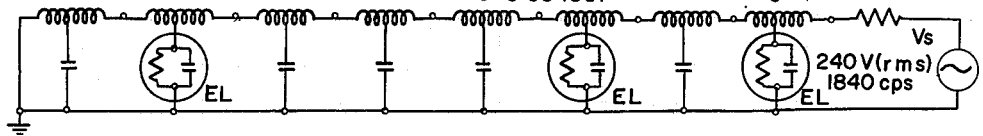

FIG.6    L=1.5h    C=0.0045uf    $R_s = \sqrt{L/C} = 18K$
240V(rms) 1840 cps

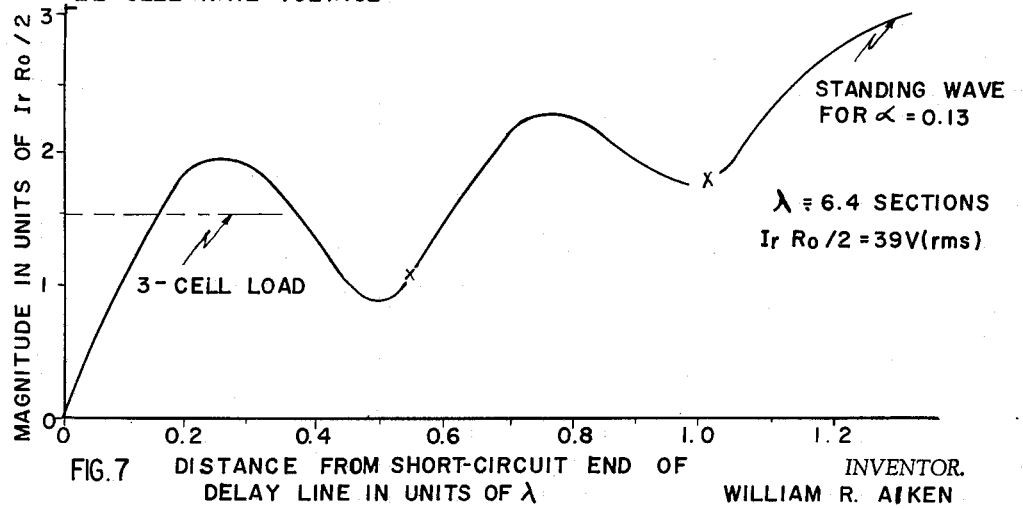

EL CELL RATE VOLTAGE

STANDING WAVE FOR $\alpha = 0.13$ $\lambda = 6.4$ SECTIONS
$I_r R_0/2 = 39V(rms)$

3-CELL LOAD

MAGNITUDE IN UNITS OF $I_r R_0/2$

FIG.7    DISTANCE FROM SHORT-CIRCUIT END OF DELAY LINE IN UNITS OF $\lambda$

INVENTOR.
WILLIAM R. AIKEN
BY *Brown Jackson Boettcher & Dienner*
ATTYS.

United States Patent Office 3,234,428
Patented Feb. 8, 1966

3,234,428
ENERGIZING MEANS FOR ELECTROLUMI-
NESCENT CELL LIGHTING SYSTEM
William R. Aiken, Los Altos, Calif., assignor, by mesne
assignments, to Kaiser Aerospace & Electronics Corporation, Oakland, Calif., a corporation of Nevada
Filed Apr. 2, 1962, Ser. No. 184,370
4 Claims. (Cl. 315—53)

The present invention is directed to the provision of a novel energizing system for capacitive devices with low power factors, and particularly to a novel energizing system for electroluminescent cells.

The standard electroluminescent cell now commercially available is basically designed to be excited by an alternating electric field. The alternating electric field assumes a capacitance to be essential to the device and the energy loss requires an associated resistance. The electroluminescent cell may be defined by an equivalent circuit comprised of a capacitance with a shunt resistance.

The electroluminescent cell equivalent circuit parameters depend on both the frequency and magnitude of the voltage across the cell. It is generally accepted that the capacitance of the cell increases and the resistance decreases with the increase of impressed voltage, whereas both the capacitance and resistance decrease as frequency is increased. However, in the voltage range of interest in the energization of electroluminescent cells now available in the field, the effects of voltage on the electroluminescent cell were found to be negligible. Since the energization system for excitation of the electroluminescent cells generally utilizes a single frequency sinusoidal signal, a simple equivalent circuit of a constant capacitance and resistance may be used for a particular excitation voltage.

It is well known that electroluminescent cells are essentially capacitive devices with low power factors. The highly capacitive nature of the cells introduces two important disadvantages in their use as large area lighting devices. First, the low power factor means that the generator must supply large amounts of reactive power to the electroluminescent cells. This so-called wattless power does no useful work in producing light, and lowers the efficiency of the lighting system because of the resulting additional $I^2R$ losses in the generator and lines. Secondly, the dependence of the light generating power on voltage and frequency conflicts with the low impedance character of the electroluminescent cell. That is, the large capacitance of the electroluminescent cell results in low impedance at efficient frequencies of operation.

It is a primary object of the present invention, therefore, to provide a novel energizing system which is operative to excite a plurality of electroluminescent cells in a more efficient manner, and which controls the electroluminescent cells to provide a light output of a higher order than is obtained by direct connection to a power source. A feature of the invention is the manner in which a delay line is used to provide the increase light output, the delay line being comprised of a number of sections, each section including an inductance and capacitance, at least certain of which sections include an electroluminescent cell (or section of an electroluminescent panel) as the capacitance (or portion of the capacitance), of such delay line section.

It is a further object of the invention to provide yet another lighting system which achieves maximum light output with uniform distribution of power between the electroluminescent cells which are connected to the line. That is, although the light output is considerably increased by the use of any delay line to excite the cells and thus constitutes an improved lighting system which has application where uniform brightness is not an absolute requirement and power source conditions may not be critical, the system does not necessarily result in maximum output. This is particularly true if the delay line is terminated by its characteristic impedance. That is, since each cell on the line in succession attenuates both the voltage and current, and the terminated line tends to use a certain amount of power in the terminating resistance, the maximum power is not applied to the cells and the cells on the line are not at uniform brightness.

It is another object of the invention, therefore, to provide a novel system including a resonant delay line for use in energizing electroluminescent cells, and specifically a resonant line having taps connected at positions thereon which effectively uses the reflected power which otherwise might be lost in a terminated delay line.

It is yet another object of the invention to provide a resonant line which in addition to using the maximum power, effects the distribution of such power uniformly to each of the electroluminescent cells which is connected to the line. As shown hereinafter on a resonant line with the terminating resistor removed, standing waves of voltage occur on the line, and the loops and nodes (maxima and minima) of the voltage are located at multiples of $\lambda/4$. It is accordingly a further object of the invention to provide a resonant delay line having a length which is an integral multiple of $\lambda/4$ and in which the sections including the electroluminescent cells, are connected at the points along the line where voltage magnitudes are equal to the rated voltages of the cells to thereby provide uniform light output by the cells.

It is yet another object of the invention to provide a novel system which includes a resonant line having a length which is an integral multiple of $\lambda/4$ and which is asymmetrical from the standpoint of loading effects, the electroluminescent cells being placed in the sections along the line where voltage magnitudes are equal to the rated voltage of the cells, and capacitors being located at other sections on the line.

It is yet another object of the invention to provide a system which eliminates the need for the provision of a source which provides reactive power to the load, and thereby results in maximum efficiency of power transmission to the load.

These and other objects and features of the invention will be best understood by reference to the following description taken in connection with the accompanying drawings, in the several figures of which like reference numerals identify like elements, and in which:

FIGURE 4 is a circuit diagram of one novel embodiment of the system including a T section resonant delay line for use in energizing a section of an electroluminescent panel;

FIGURE 5 is a graph of the maxima and minima voltage magnitudes along the delay line of FIGURE 4;

FIGURE 6 is a circuit diagram of a novel embodiment of the system including a multiple T section asymmetrical resonant delay line;

FIGURE 7 is a graph of the maxima and minima voltage magnitudes along the delay line of FIGURE 6;

*General description*

The novel energizing system disclosed hereinafter basically comprises a delay line in which the capacitance (or at least a portion of the capacitance) of capacitors normally used in the delay line are replaced by the electroluminescent cells and the capacity thereof. As shown hereinafter the specific embodiments of the invention illustrate both the pi section and T section version of the delay line, although the invention is not considered to be limited thereto.

Acording to the invention, each electroluminescent cell takes the place of a capacitor in the circuit and absorbs only that portion of the supplied current and voltage as is required by the cell for actual power (and used as heat radiation or light generation by the cell), and passes the remaining signal along the delay line to the subsequent cell which is connected thereto. The line thus presents a resistive load to the power source.

In the following description an electroluminescent cell is considered to be a standard cell which is excited by an alternating electric field which assumes the capacitance to be essential to the device, and the energy loss requires an associated resistance. Such properties can be defined by an equivalent circuit comprised of a capacitance with a shunt resistance, and in the figures and following description the cell is therefore represented as an equivalent circuit comprised of such components.

The equivalent circuit parameters depend on both the frequency and magnitude of voltage across the cell. As known in the art, the capacitance increases and the resistance decreases with the magnitude of the impressed voltage whereas both the capacitance and the resistance decrease as frequency is increased.

In the voltage range of the arrangements disclosed hereinafter, the effects of voltage on the cell capacitance and resistance were found to be negligible. However, the capacitance and shunt resistance of the cells were significantly effected by frequency. As shown hereafter, capacitance and resistance were inverse functions of frequency, the capacitance decreasing by fifty percent and losses in the shunt resistance increasing by fifty percent with a change of power frequency from 1000 to 4000 c.p.s.

In the following description the excitation of the electroluminescent cells is considered in terms of a single frequency sinusoidal signal, and accordingly the simple equivalent circuit of a constant capacitance and resistance may be used for a particular value of excitation voltage. In arrangements in which a signal includes more than one frequency the dependent nature of the cells must be considered.

*Specific description*

Figure 1:
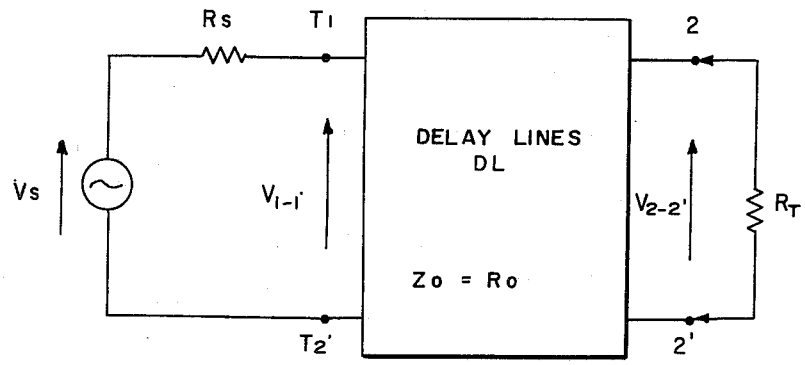
FIGURE 1 is a schematic circuit including a delay line used to energize a plurality of electroluminescent cells or sections of an electroluminescent panel.

With reference now to FIGURE 1, the circuit thereshown illustrates in block the basic arrangement for the novel lighting system, and as shown, includes a power source $V_s$, including internal impedance $R_s$, a delay line DL, and in some embodiments a terminating resistor $R_t$, the delay line being comprised of a number of pi sections or T sections, as shown in more detail hereinafter.

Figure 2:
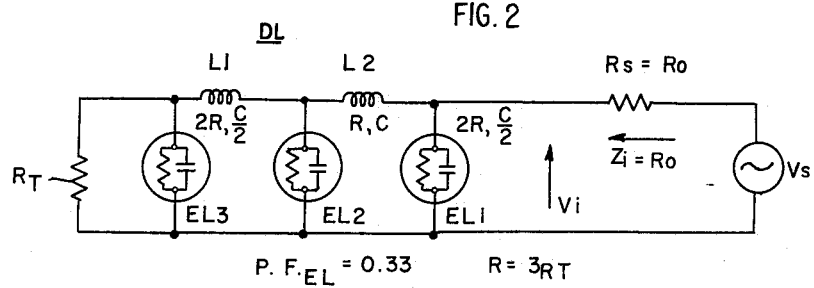
FIGURE 2 is a circuit diagram of one novel embodiment of the system including a pi section delay line for energizing electroluminescent cells or panels.
Figure 3:
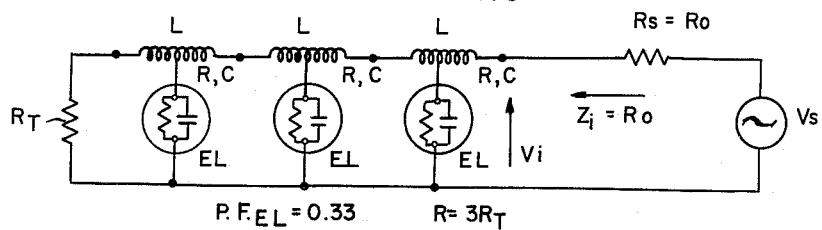
FIGURE 3 is a circuit diagram of one novel embodiment of the system including a T section delay line for energizing sections of an electroluminescent panel or cell.

With reference now to FIGURES 2 and 3, the detail structure of two delay lines with electroluminescent cells are shown connected in a circuit such as shown in FIGURE 1, the cells being operative in such arrangement to supply an increased amount of light for a given power output. With specific reference to FIGURE 2, a voltage source $V_s$ having a source impedance $R_s$ is connected to supply power to a pi section type delay line, comprised of two sections including inductances $L_1$, $L_2$ respectively and three electroluminescent cells, $EL_1$, $EL_2$, $EL_3$. As indicated above each of the electroluminescent cells are represented by equivalent circuit comprised of a capacitance and shunt resistance $(2RC/2)$ $(R, C)$ $(2RC/2)$ respectively. The characteristic impedance of the delay line is represented by resistance $R_0$, and the source impedance $R_s$ and characteristic impedance $R_0$ are matched.

In the illustrated embodiment of FIGURE 2 the power factor of the electroluminescent cell was 0.33, and the resistance R equals 3 $R_0$.

Generally speaking, if all the sections of delay line DL are matched, and if the terminal resistance $R_t$ is matched with the characteristic impedance $R_0$ of the delay line, then the incident wave of energy from the voltage source $V_s$ passes along the delay line DL without reflections and is entirely dissipated in the terminal resistance $R_t$. If the losses along the delay line DL are negligible, then the load which the voltage behind the source impedance sees is the resistance $R_S + R_T$.

As long as terminal resistance $R_t$ is matched with the characteristic impedance $R_0$, there is no reflection of the incident energy wave and $R_s$ does not need to be matched to $R_0$. The delay line in such arrangement may be any number of sections in any length, and the circuit, when properly terminated, operates as a simple resistance circuit in which the load between the terminals $T_1$, $T_2$, is equal to $R_0$.

The arrangement shown in FIGURE 3 illustrate a T section delay line which is connected to a power source $V_s$ and is terminated by a resistance $R_t$. The center tap toroids had an inductance of 1.5 henries, the characteristic impedance of the delay line thereby being matched approximately to the impedance for a single cell at 2000 c.p.s. In use of the system for producing light, the voltage source was operated at a frequency of 2000 c.p.s. and the impedance of the electroluminescent cell was lowered from about 400K to approximately 18K. The lamps as in the structure of FIGURE 2, were commercially available low voltage panelescent lamps which were rated at 120 volts at a frequency of 60 c.p.s. Capacitance factor was found to range from .0043 to .0067 mf. and the dissipation factor ranged from .20 to .30 at 120 volts/60 c.p.s. The arrangement of FIGURES 2 and 3 resulted in a substantial increase in light output relative to the light output which may be obtained if the cells were connected directly to the generator. The distribution of the voltage in such arrangement was such that the cell closest to the voltage source had maximum light output and the successive cells had correspondingly reduced light output, the values in the pi section delay line ranging from 1.0 to .75 and in the T section delay line ranging from 1.0 to .65.

In such arrangements, assuming that an electroluminescent cell has a power factor of 33⅓ percent, the cell will consume ⅓ of the total power (in volt amperes) which is applied thereto. The rate of power consumed by the cell is determined by the rated volt-amperes of the cell and by its power factor. If the rated volt-amperes is equal in magnitude to the in-phase power input to the delay line, then the absolute maximum number of cells at rated output which may be coupled to the line is the reciprocal of the power factor (in the present Example 3). In the case of a delay line terminated by its characteristic impedance each cell in succession attenuates both the voltage and current. Thus, the first cell uses ⅓ of the volt amperes and passes on the remaining ⅔ to the second cell, the second cell uses ⅓ of the volt amperes which is received from the first cell and passes the remaining portion to the third cell, and the portion which is not consumed by the third cell is dissipated in the resistance. As shown hereinafter the use of the delay line in such manner considerably improves the light output which would be obtained by the direct connection to the generator, but has the disadvantage of nonuniformity of light output of the different cells or panels. Such arrangement may, of course, be used advantageously in that the inclusion of separate switches for the different panels provides an inexpensive dimmer system in which various degrees of lighting may be readily selected. Such arrangement would have special utility in a stacked or layered arrangement of cells or panels, wherein different layers would provide different light outputs, and various combinations could be selected to adjust the light output to different levels. It will be apparent that such arrangement may also be used with the embodiments set forth hereinafter.

In a further improved embodiment of the invention, the system includes a resonant delay line connected to establish voltage standing waves along the line, as energized by a power source, the electroluminescent cells being connected to the delay line at points along the line at which large uniform voltages occur. In such arrangements, the length of the line is an integral multiple of $\lambda/4$ which results in an input impedance to the delay line which is primarily resistive. An exemplary system utilizing a delay line having eight "T" section delay lines is shown in FIGURE 4, and as there shown the voltage source $V_s$ comprises a 240 v. (r.m.s.) source in which the sine wave generator frequency was 1840 c.p.s. so that the line would be an integral multiple of a quarter wavelength. The generator impedance was adjusted to 18K and the line was shorted. Center tapped toroids with an inductance of 1.5 were used. Electroluminescent cells were used which were nearly matched at 0.0045 μf.

Voltage distribution on the line is shown in FIGURE 5, and agrees with the voltage distribution predicted in theory. Further the provision of a delay line which is a multiple of the quarter wavelength eliminated the interexchange of reactive power between generator and load. The current and voltage inputs to the delay line were observed on an oscilloscope to be in phase.

Tests were made with the delay line in a short-circuit condition, a terminated condition and an open circuit condition. A comparison of the results indicated that eight electroluminescent cells in the resonant delay line of FIGURE 4 provided four times the light output of eight electroluminescent cells directly connected to the generator source. Similar results obtain with the use of resonant delay line having pi sections.

The system shown in FIGURE 6 also utilizes a resonant delay line which has asymmetrical loading for the purpose of providing a more uniform light output by each of the cells on the line, and improving the capability of the generator to transmit light-generating power. In such arrangement, the components were similar to the components of FIGURE 4 with the exception that five of the cells of FIGURE 5 were replaced by paper capacitors of approximately the same capacitance. The capacitors were of very low power factors and the losses relative to the electroluminescent cells were negligible. The delay line then becomes asymmetrical with the principal losses in the electroluminescent cells.

The resultant voltage distribution data is shown in FIGURE 7, and it is apparent that the standing wave distribution has been reduced considerably from that in FIGURE 5. Of more consequence, the light output from the three cells connected to the resonant asymmetrical delay line exhibited greatly improved uniformity.

Figure 8:
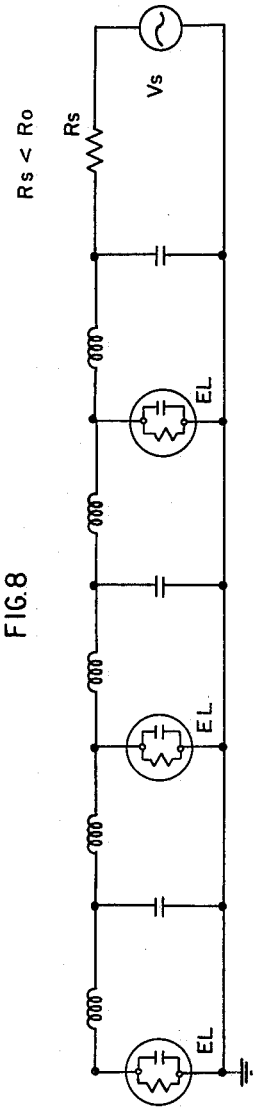
FIGURE 8 is a circuit diagram of a novel embodiment of the system including a multiple pi section asymmetrical resonant delay line.
Figure 9:
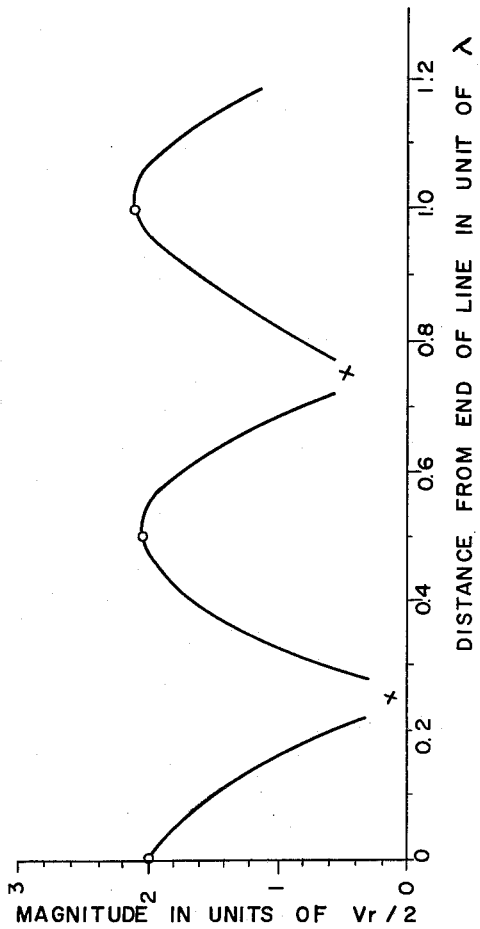
FIGURE 9 is a graph of the maxima and minima voltage magnitudes along the delay line of FIGURE 8.

The system of FIGURE 8 includes a resonant asymmetrical delay line utilizing pi sections including three cells and three capacitors positioned on the line to provide uniform light output and maximum brightness, the resultant voltage data on the line and the positioning of the electroluminescent cells being apparent with reference to FIGURE 9.

It was found that in providing any of the resonant delay lines the condition of short circuit termination was more advantageous in the T section delay line and open circuit termination was of more advantage in the pi section line. In each of the resonant delay line arrangements the length of the resonant line was preferably an integral multiple of the $\lambda/4$ wave length, and was determined by (a) the number of cells to be excited from the line, (b) the attenuation of the line as well as the extent of uniform voltage desired across cells, and (c) the extent of the multiple reflections.

More specifically by making the length of the line, an integral of the $\lambda/4$ wave length the efficiency of power transfer required is accomplished. That is, the resistive input impedance to the delay line eliminates the interchange of reactive power between the electroluminescent cells and the generator, and in such manner the $I^2R$ losses in the generator are reduced and improved efficiency of the system is accomplished.

In selecting a line for a given number of electroluminescent cells (or sections of an electroluminescent panel), if greater uniformily is desired, the length of the line is adjusted to provide a sufficient number of standing waves to permit placing of an electroluminescent cell near the top of the voltage loop for a standing wave. With such arrangement maximum available voltage is provided for each cell and the arrangement is less sensitive to frequency changes, since for a given change of a frequency at the top of the voltage loop the voltage change is smaller than at any other location along the line.

In the provision of maximum power on a resonant line, some of the reflected waves are reflected back into the delay line instead of being dissipated in the generator impedance. In the case of a delay line having an open circuit termination, a positive reflection occurs at one end of the line. If the line is an odd integral multiple of $\lambda/4$, then the reflected wave arrives at the generator 180° out of phase with the input voltage wave. By providing a generator impedance which is less than the characteristic impedance, a part of the wave is reflected back into the delay line in phase with the input voltage wave to thereby provide increased build-up of voltage on the line and increased efficiency.

Conclusion

By the proper distribution of portions of an electroluminescent panel along a delay line, or the proper distribution of individual cells along a delay line, all of the applied driving volt amperes may be directly used as power in the panel or cells. The most practical configuration from the standpoint of simplicity, reliability and economy results with the use of a delay which has a length which is an integral multiple of the quarter wavelength (arranged to be odd or even to take advantage of each of the multiple reflections available), and which is long enough to provide a voltage peak for each electroluminescent cell to be energized. The number of sections in the line is in turn determined by the number of cells to be excited. A T section relay line requires two sections per quarter wave length in order to take best advantage of the voltage peaks, whereas the pi section line requires only one section per quarter wavelength. For purposes of maximum transfer of power, the output impedance to the delay line should match the source impedance, and the input impedance of the resonant line should be directly proportional to characteristic impedance of the delay line.

A circuit arrangement using a resonant or reflective line long enough to have sufficient voltage peaks appears most practical, since the light may be designed to light up cells uniformly and use up all of the available power in the load.

While only particular embodiments of the invention have been described and illustrated, it is apparent that modifications and alterations may be made therein. Accordingly it is the intention in the appended claims to cover all such modifications and alterations as may fall within the true spirit and scope of the invention.

What is claimed is:

1. In an arrangement for providing maximum distribution of input power to a light producing system, a plurality of discrete electroluminescent cells, a delay line including input means connecting only one end of said delay line to a source of alternating current, and a plurality of sections, each of which includes an inductance and capacitance element, at least certain of which sections include an electroluminescent cell connected to provide at least a portion of the capacitance of the section, and terminating means terminating the other end of said delay line open circuit to provide standing waves of an increased voltage simultaneously at a plurality of predetermined points along said delay line responsive to energization by said alternating current, and means for connecting the sections including the electroluminescent cells to said points on said delay line at which the maximum voltage of the standing waves occurs, said terminating means reflecting the unused power at the other end of said line to provide simultaneous energization of said plurality of cells at said points with maximum efficiency.

2. A system as set forth in claim 1 in which said delay line is an integral multiple of $\lambda/4$.

3. In an arrangement for providing maximum distribution of input power to a light producing system, a plurality of discrete electroluminescent cells, a delay line including input means connecting said delay line to a source of alternating current, and a plurality of sections, each of which includes an inductance and capacitance element, at least certain of which sections include an electroluminescent cell connected to provide at least a portion of the capacitance of the section, terminating means connected to terminate said delay line short circuit to provide standing waves of an increased voltage at a plurality of predetermined points along said delay line, and means for connecting the sections including the electroluminescent cells to said points on said delay line at which the maximum voltage of the standing waves occurs, said terminating means being connected to reflect the unused power transmitted on said line to provide simultaneous energization of said plurality of cells at said point with maximum efficiency.

4. A system as set forth in claim 3 in which said delay line is an integral multiple of $\lambda/4$.

References Cited by the Examiner
UNITED STATES PATENTS

| | | | |
|---|---|---|---|
| 804,189 | 11/1905 | Fleming | 324—81 |
| 1,824,572 | 9/1931 | Roberts | 315—323 X |
| 2,571,156 | 10/1951 | Nelson | 315—246 X |
| 2,851,634 | 9/1958 | Kazan | 315—169 |
| 2,886,777 | 5/1959 | Hurvitz | 324—78 |
| 2,967,266 | 1/1961 | Diemer | 315—169 |
| 3,061,781 | 10/1962 | Diemer | 313—108 |

JOHN W. HUCKERT, *Primary Examiner.*

JAMES D. KALLAM, DAVID J. GALVIN, *Examiners.*